(12) United States Patent
Canzi (10) Patent No.: US 10,704,719 B2
(45) Date of Patent: Jul. 7, 2020

(54) HYDRAULIC AND/OR PNEUMATIC MULTI-COUPLING CONNECTOR WITH LEVER ACTUATED MECHANISM

(71) Applicant: Faster S.P.A., Rivolta d'Adda (IT)

(72) Inventor: Luigi Canzi, Melzo (IT)

(73) Assignee: FASTER S.P.A., Rivolta d'Adda (IT)

( * ) Notice: Subject to any disclaimer, the term of this patent is extended or adjusted under 35 U.S.C. 154(b) by 18 days.

(21) Appl. No.: 16/155,296

(22) Filed: Oct. 9, 2018

(65) Prior Publication Data

US 2019/0145561 A1  May 16, 2019

(30) Foreign Application Priority Data

Oct. 19, 2017  (EP) .................................... 17197329

(51) Int. Cl.
| | |
|---|---|
| *F16L 29/00* | (2006.01) |
| *F16K 11/18* | (2006.01) |
| *F16K 31/52* | (2006.01) |
| *F16L 37/44* | (2006.01) |
| *F16K 31/524* | (2006.01) |
| *F16L 37/56* | (2006.01) |
| *F16L 37/30* | (2006.01) |
| *F16L 37/38* | (2006.01) |

(52) U.S. Cl.
CPC .......... *F16L 29/007* (2013.01); *F16K 11/185* (2013.01); *F16K 31/52* (2013.01); *F16K 31/52408* (2013.01); *F16L 37/44* (2013.01); *F16L 37/56* (2013.01); *F16L 37/30* (2013.01); *F16L 37/38* (2013.01)

(58) Field of Classification Search
CPC .. F16K 11/185; F16K 31/52; F16K 31/52408; F16L 29/007
See application file for complete search history.

(56) References Cited

U.S. PATENT DOCUMENTS

| | | | |
|---|---|---|---|
| 6,016,835 A | 1/2000 | Maldavs | |
| 7,568,502 B2 | 8/2009 | Marquis | |
| 7,673,606 B2* | 3/2010 | Ng et al. ................... | F01L 1/18 |
| | | | 123/90.16 |
| 2017/0321836 A1* | 11/2017 | Danelli et al. .......... | F16L 37/36 |

FOREIGN PATENT DOCUMENTS

| | | |
|---|---|---|
| DE | 102015202916 | 8/2016 |
| WO | WO2015067793 | 5/2015 |
| WO | WO2015067794 | 5/2015 |
| WO | WO2015068141 | 5/2015 |

* cited by examiner

*Primary Examiner* — Kevin L Lee
(74) *Attorney, Agent, or Firm* — Stetina Brunda Garred and Brucker

(57) ABSTRACT

The present invention relates to a hydraulic and/or pneumatic multi-coupler connector of the type comprising at least one pair of couplers inserted into a containment body and equipped with a lever actuated mechanism comprising an actuation lever maneuverable by the user for the relief of the residual pressure of the couplers and the connection thereof to corresponding male couplers.

7 Claims, 8 Drawing Sheets

HYDRAULIC AND/OR PNEUMATIC MULTI-COUPLING CONNECTOR WITH LEVER ACTUATED MECHANISM

CROSS REFERENCE TO RELATED APPLICATION(S)

The present application claims priority to European Patent Application No. 17197329.0 filed Oct. 19, 2017, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention belongs to the field of hydraulic and/or pneumatic connections. In particular, the present invention relates to an hydraulic and/or pneumatic connector of the multi-coupling type. In detail, the present invention relates to a hydraulic and/or pneumatic connector of the multi-coupling type comprising a pair of quick couplings and a lever actuated mechanism of said couplings.

More in detail, the connector according to the present invention comprises at least two couplings of the female type, actuatable by means of a lever.

The present invention provides, in detail, a connector of the aforesaid type, shaped so as to allow an assembly thereof simplified with respect to the connectors of the corresponding type as known in the background art.

Furthermore, the device of the present invention is more reliable and safe with respect to the known devices.

BACKGROUND ART

Connection devices (generally, connectors) comprising a pair of manually actuatable quick couplings (in the following also referred to as quick couplers) of the female type are known in the field of hydraulic and/or pneumatic connections.

Among the known solutions, document U.S. Pat. No. 6,016,835 A shows how to make a connector comprehensive of a female coupler inserted into a containment body and actuatable by the user by means of a lever and a camshaft.

A further solution is known from document U.S. Pat. No. 7,568,502 B2, which shows, in particular, the possibility of relieving the pressure inside the couplers of the female type before and/or during the coupling of the male with the female by means of a lever actuation actuatable by the user. In such known solution, the actuation lever acts on a cam having two ends, each of said ends being adapted to contact a female coupler, said cam being adapted to rotate with respect to a central shaft on which it is hinged. This movement of the cam is obtained by means of the use of stop members movable with respect to the containment body of the connector, so that the cam abuts against said stop member when the coupler is in the coupling position, thus opening the pressure relief valve of the coupler of the female type.

The connector known from the prior art document U.S. Pat. No. 7,568,502 B2 therefore suitably provides a stop member distinct from the cam and from the containment body of the connector. In particular, the operation of the connector provides that, in case of a movement of the lever by the operator, the movement of the lever results in a rotation of the cam which, rotating, actuates the pressure relief valve of one of the two female couplers depending on one and, respectively, the other, depending on the direction of rotation of the cam and therefore on the direction of the movement of the lever.

Furthermore, when the female coupler is in the coupling position with a male coupler, the corresponding stop member keeps the pressure relief valve open: the cam may move away from the female coupler without causing the closing of the decompression valve.

By virtue of this expedient, the operator may operate on the lever so as to move the first end of the cam away from the first coupler and draw the second end of the cam near the second coupler to actuate the decompression valve of the second coupler without the valve of the first coupler closing.

At the second coupler, interposed between said second coupler and the containment body of the device, a corresponding second stop member for the second coupler is provided.

The operator, acting on the lever, pushes the second end of the cam in abutment with the second female coupler, causing the opening of the decompression valve and, therefore, allowing the coupling of the female coupler with a corresponding male coupler.

Once both couplers are coupled, the operator lets the cam, and therefore the actuation lever, return to neutral position, the decompression valves of the female couplers being kept open by the stop members.

The connector of U.S. Pat. No. 7,568,502 B2, therefore, allows, with respect to other background art solutions, to actuate the female couplers individually. The operator may, by acting on the actuation lever, selectively operate on a coupler at a time, both in the coupling and the decoupling steps.

However, the known solutions briefly summarized above, although valuable from different points of view (in particular, reliability), have drawbacks and/or disadvantages that the present invention aims at overcoming or at least minimizing.

For example, the connector known from document U.S. Pat. No. 7,568,502 B2, while allowing the independent actuation of the two couplers, involves considerable practical assembly difficulties, which make the production process of the device long, with a consequent negative impact on production costs.

In fact, the fact that the couplers actuation cam is made in one piece necessarily entails inserting the same into the block or main containment body (in which the two female couplers are housed) through a front opening to be provided in the containment body, which shall then be closed once the cam has been connected to the rotatable shaft actuated by the lever and on which said cam shall be hinged.

The need to provide an opening on the containment body involves various contraindications.

In fact, the containment body is made in a single block so as to ensure, when operating, the seal required for the fluid operating pressures; an opening to be closed once the assembly is completed is still less reliable from the point of view of the seal, where leakages and/or similar drawbacks may arise and/or follow during operating life.

Furthermore, the cam insertion window, as well as complicating the production process of the device, in particular the process for obtaining the containment body which shall be suitably worked to provide such opening, the presence of such opening at the cam, i.e., at the collecting channel of the pressurized fluid which is relieved by means of the stem valves of the female couplers, may compromise the functionality, reliability and safety of the block itself.

It is therefore a goal of the present invention to overcome or at least minimize the drawbacks observed in the connectors in accordance with the background art. In particular, it is a first object of the present invention to provide a connector, in particular of the multi-coupler type with lever actuation, the configuration thereof resulting in simplified assembly procedures and therefore in low assembly and production costs.

It is a further object of the present invention to provide a connector of the aforesaid type in which the housing body of the couplers and related actuation means (cams and leverages) does not comprise an assembly window to be closed once the assembly is competed, but is rather made in a single piece, for example by means of fusing.

Finally, it is a further object of the present invention to provide a connector in which the actuation cams of the couplers are insertable into the main housing body and are boundable to the relative rotation shaft through the seats intended to house the two respective couplers.

SUMMARY OF THE PRESENT INVENTION

The present invention originates from the general consideration according to which the drawbacks observed in the known connectors may be overcome or at least minimized by splitting the single cam of the known type into two cams; in this way, in fact, each cam may be inserted into the main housing body through the seat intended to house the corresponding coupler, thereby overcoming the need to make an insertion window in the main housing body.

Furthermore, a further consideration underlying the present invention relates to the fact that by suitably conforming the main housing body, in particular the interior thereof, by inserting each of the cams in the corresponding coupler seat, each of the cams will be led into the final position thereof (in which it is bound to the rotation shaft, set in rotation by means of the external lever) essentially in an automatic manner, save for possible minor corrections easily carried out by an operator.

In consideration of both the foregoing and the drawbacks and/or disadvantages observed in the connectors of the known type, the present invention relates to a connector device of the multi-coupler type comprising at least one pair of couplers inserted into a housing body and equipped with a lever actuated mechanism comprising an actuation lever maneuverable by the user for the relief of the residual pressure of the couplers and the connection thereof to corresponding couplers, characterized in that said lever actuated mechanism further comprises a pair of cams, said cams being movable simultaneously and in a counterposed manner by said actuation lever.

According to an embodiment, said actuation lever is mechanically connected to a central pin so that the movement of said actuation lever sets in rotation said central pin on which said cams are rigidly engaged.

According to an embodiment, said actuation lever is shiftable between a rest position and a first position and between said rest position and a second position, where the shift of said lever from said rest position to said first position results in the rotation of said central pin and said two cams in a first direction of rotation, and where the shift of said lever from said rest position to said second position results in the rotation of said pin and said cams in a second direction of rotation opposite to said first direction of rotation.

According to an embodiment, the rotation of said cams in said first direction of rotation results in the actuation of a first coupler by one of said cams, and in that the rotation of said cams in said second direction of rotation results in the actuation of the second coupler of said at least two couplers by the second of said two cams.

According to an embodiment, the actuation of said first coupler involves the actuation of a pressure relief valve on the corresponding coupler and in that the actuation of said second coupler involves the actuation of a pressure relief valve on the corresponding coupler.

According to an embodiment, each of said cams comprises a central body from which a rod-like portion ending with a free end departs.

According to an embodiment, each of said central bodies comprises a seat for receiving the pin set in rotation by said actuation lever.

According to an embodiment, said pin comprises an engagement portion on which corresponding seats, respectively obtained in said central bodies, are engaged for shape and size.

According to an embodiment, said housing body is a single body without front access compartments.

According to an embodiment, said cams are housed inside an internal chamber of said housing body, said chamber being suitably shaped so as to lead in an obliged manner the positioning of the cams during the assembly thereof.

Further embodiments and/or features of the present invention are defined in the claims.

LIST OF THE DRAWINGS

The present invention finds a particularly advantageous application in the case of hydraulic and/or pneumatic connectors of the multi-coupler type with lever actuation, this being the reason why the present invention will be clarified below with particular reference to the case of connectors of the aforesaid type; however, the possible applications of the present invention are not limited to connectors of the multi-coupler type with lever actuation. Conversely, the present invention finds application in connectors of different type, in particular in those in which the coupling of the male and female couplers provides for the prior relief of the residual pressure.

In the following, the present invention will be clarified in detail by means of the following detailed description of the (non-limiting) embodiments of the present invention depicted in the drawings, whereins.

Figures from 4a to 4c show the sequence of the assembly operations of the cams inside the connector device according to an embodiment of the present invention.

DETAILED DESCRIPTION OF THE INVENTION

In the following description, the female coupler to which reference is made shall be intended purely by way of non-limiting example; therefore, the present invention may be applied to any type of coupler that makes the employment thereof useful, providing, of course, the appropriate modifications.

Figure 1:
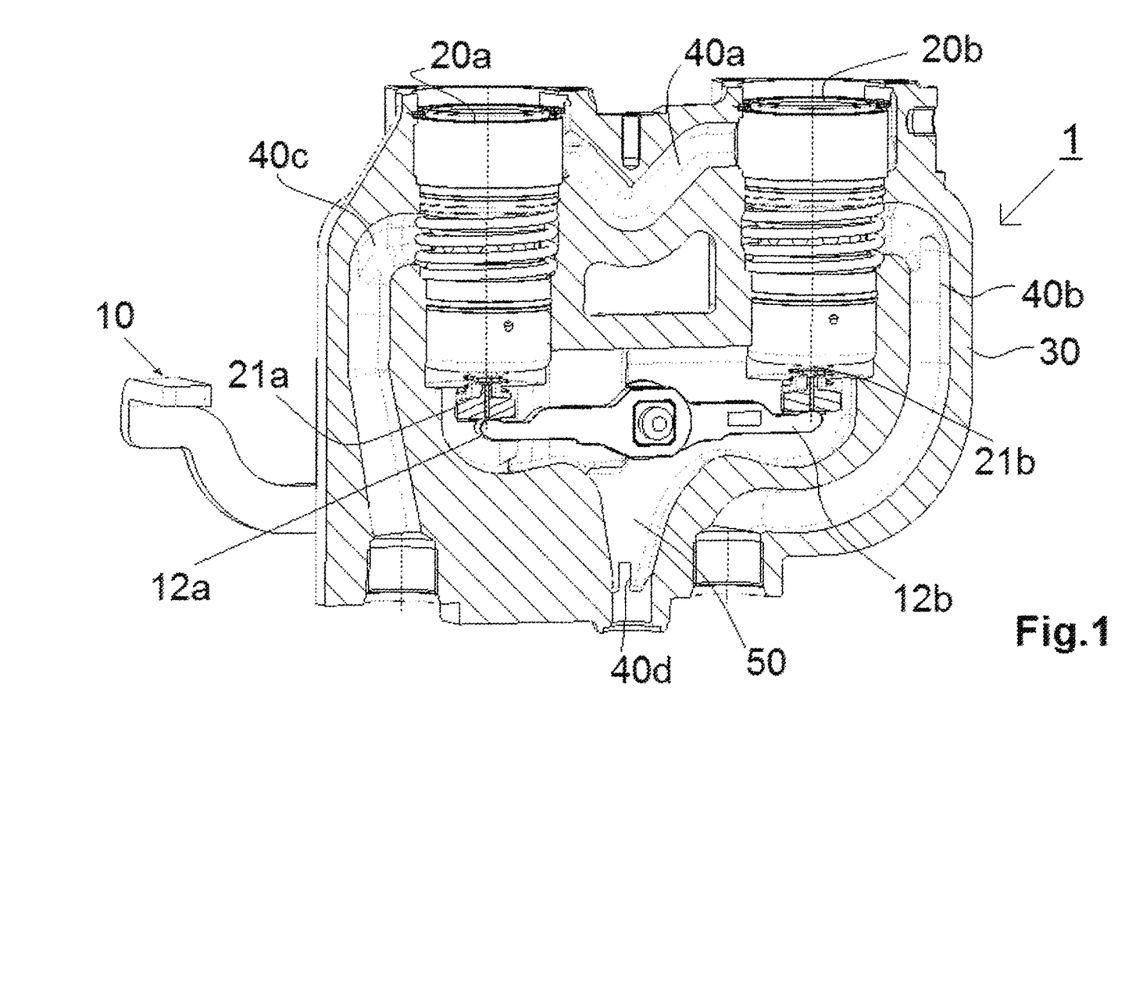
FIG. 1 shows a partial section view with a vertical transverse plane of the multi-coupler connector device with lever actuation according to an embodiment of the present invention in which the lever and the actuation cam are in rest position.

With particular reference to FIG. 1, reference numeral 1 identifies the connector device of an embodiment of the present invention.

The multi-coupler device 1 comprises at least two female couplers 20a, 20b, each housed in a corresponding housing seat obtained inside a main housing body or block 30.

Inside the housing body 30, in accordance with solutions substantially known in the background art and therefore not described in detail for the sake of conciseness, connection channels 40a, 40b, 40c, 40d are suitably provided to convey the working fluid, in particular, oil or gas.

Among these, in the lower region of the main housing body or block 30, a fluid relief channel 40d is provided connected to a containment chamber 50 obtained inside the housing body or block 30 below the female couplers 20a, 20b.

The lower part of the couplers 20a, 20b comprises an actuation stem 21a, 21b each for the valve for relieving pressure from the respective couplers 20a, 20b, where, with each of the couplers 20a, 20b housed in the respective seat of the housing body 30 as represented, each of the stems 21a, 21b faces the housing or containment chamber 50.

Advantageously, the device according to the embodiment of the present invention shown in the Figures comprises an actuation lever 10 protruding outside the housing body or block 30 so as to be actuatable by the user.

Said actuation lever 10 may in fact be moved by the user, in particular alternately upwards and downwards (with respect to the Figures), wherein the movement of the lever 10 determines a corresponding rotation in two respectively opposite directions of rotation (clockwise or counterclockwise with respect to the Figures) of a pin or small shaft 11 for the movement of the cams.

Said pin 11, adapted, as said, to be set in rotation by means of said actuation lever 10, is in fact connected to a pair of cams 12a, 12b.

Figure 5:
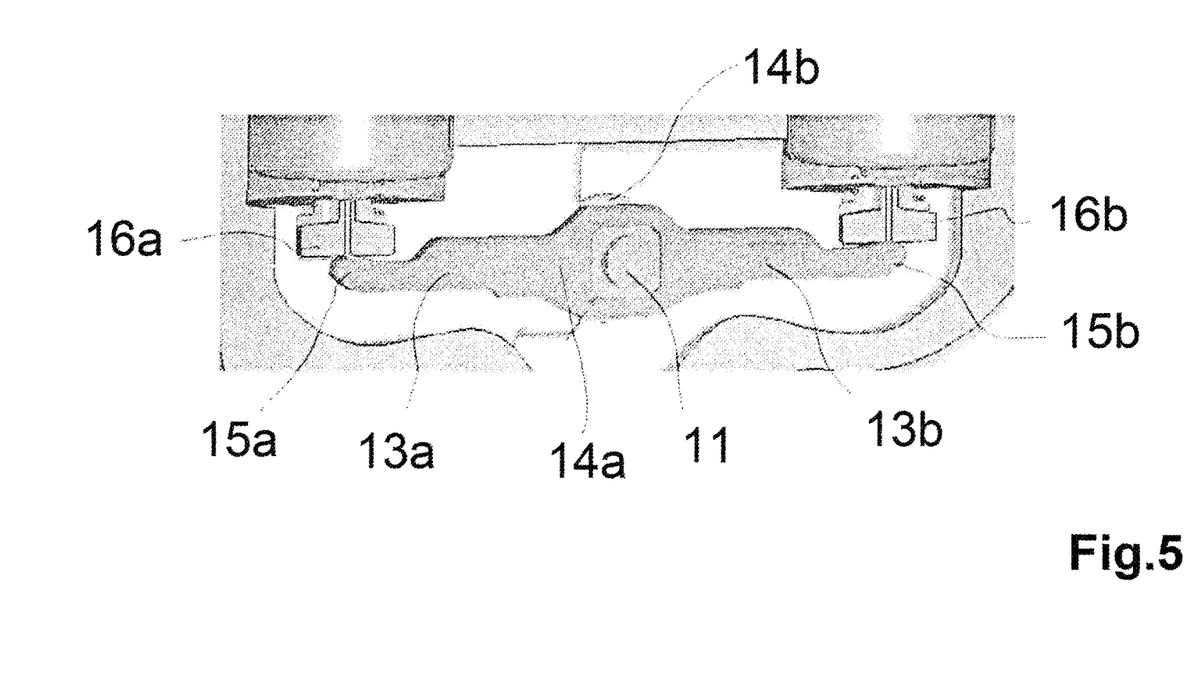
FIG. 5 shows construction details of the cams in a connector device according to an embodiment of the present invention.

More in detail, the connector device according to the embodiment of the present invention shown in the Figures comprises a first cam 12a and a second cam 12b, each of which has an elongated body comprising a substantially rectilinear rod-like portion 13a, 13b which develops from a central body 14a, 14b having a seat for engaging on said pin or small shaft 11, and a free end 15a, 15b opposite to the engagement end, respectively 14a, 14b.

Each free end 15a, 15b is adapted to act in engagement (in particular, by pushing) with a pusher 16a and 16b, respectively, each of said pushers 16a and 16b being interposed between the end 15a and 15b, respectively, and the end of said stems 21a and 21b, respectively, for actuating the relief valves of the female couplers 20a and 20b, respectively, in accordance with the following modes.

As shown, said pin 11, at the end on which the cams 12a, 12b are assembled by engagement, has a square cross-sectional engagement portion (with rounded corners) adapted to be engaged by a seat of corresponding shape and size, obtained in the engagement portion 14a, 14b of the cam 12a and the cam 12b, respectively, where the shape and size tight fit between the square section portion of the pin 11 and the corresponding seats of the cams 12a and 12b allows that the rotation of the pin 11 in the two clockwise and counterclockwise directions of rotation (with respect to the Figures) results in a simultaneous rotation in the same direction of rotation, clockwise and, respectively, counterclockwise of the cams 12a and 12b.

The operation modes of the connector device according to the embodiment of the present invention shown in the Figures may be summarized as follows.

In the starting configuration, also called "neutral" as depicted in FIG. 1, prior to the connection of the female couplers 20a and 20b with the couplers of the male type (not shown in the Figures), the lever and the pin 11 are both in neutral position, wherein each of the ends 15a and 15b of the cams 12a and 12b, respectively, engage, without pushing, with the pusher 16a, 16b, wherein each pusher 16a, 16b has, in accordance with essentially known modes, a top part shaped so as to allow the outflow of fluid from the decompression valves of the couplings 20a and 20b, respectively, in the chamber 50, and a hole in a substantially central position for the expulsion of the air.

Furthermore, the cams 12a and 12b are kept in the neutral position (substantially horizontal, FIG. 1) by means of two thrust springs (not shown in the Figures) each interposed between the pusher 16a, 16b and the end of the stem 21a and 21b, respectively.

In fact, without the aforesaid springs, an involuntary and/or accidental decompression may occur due to the weight of the lever subjected to the vibrations of the means or devices on which the system is assembled.

Figure 2:
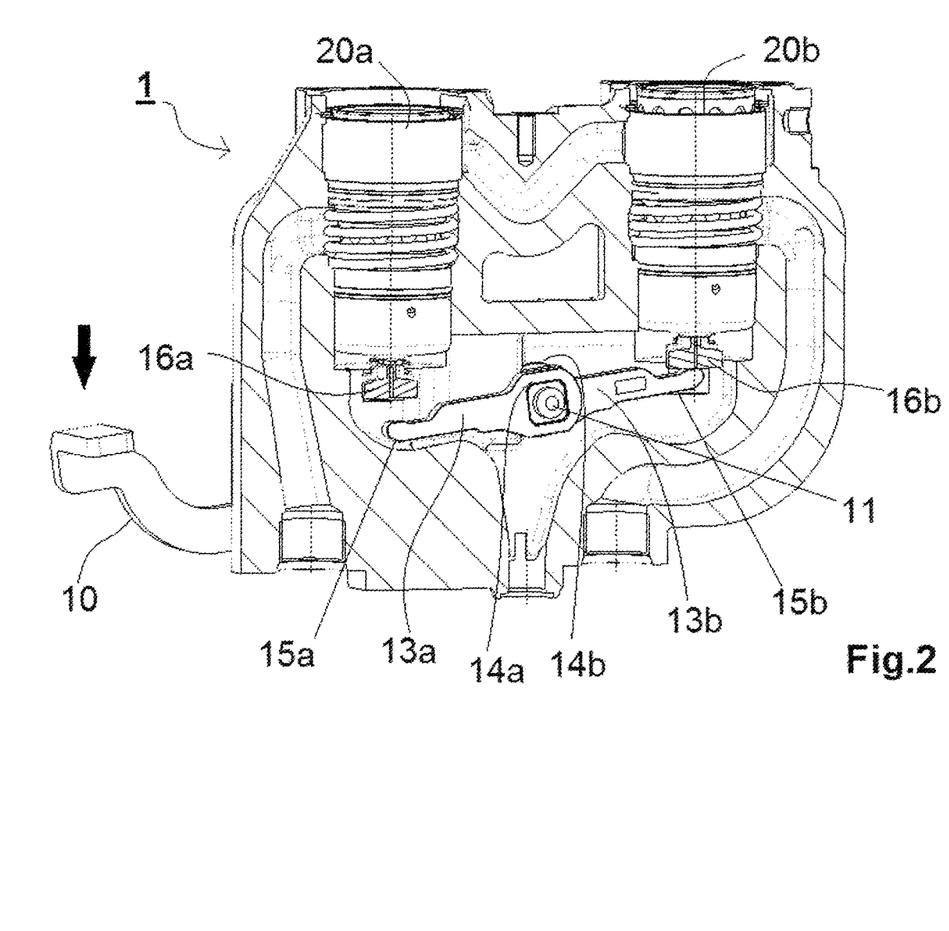
FIG. 2 shows a partial section view with a vertical transverse plane of the multi-coupler connector device with lever actuation according to an embodiment of the present invention in which the actuation lever is lowered by the operator causing the rotation of a first cam.

With reference to FIG. 2, when the user pushes the lever 10 downwards, the pin 11 is rotated counterclockwise with reference to the front view of FIG. 2, wherein, therefore, the cams 12a and 12b are rotated in the same counterclockwise direction of rotation, and therefore wherein the free end 15b of the cam 12b acts by pushing on the pusher 16b and causes the upwards shifting movement of the second pusher 16b, which therefore actuates the decompression valve of the second coupler 20b.

Figure 3:
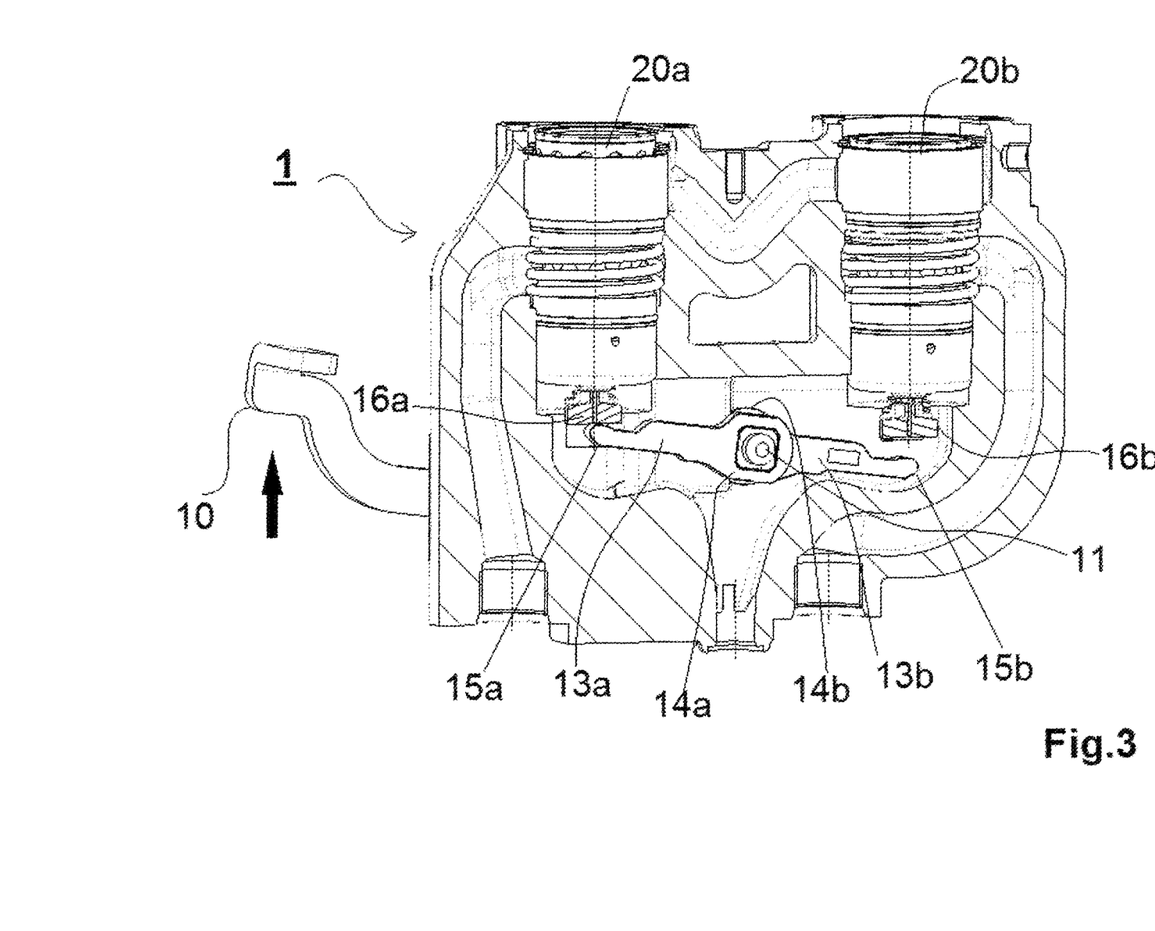
FIG. 3 shows a partial section view with a vertical transverse plane of the multi-coupler connector device with lever actuation according to an embodiment of the present invention in which the actuation lever is raised by the operator causing the rotation of the second cam.

With reference to FIG. 3, in a way similar to what described above with reference to FIG. 2, it is noted how an upwards movement of the lever 10 involves a clockwise rotation of the pin 11, wherein, therefore, the cams 12a and 12b are rotated in the same clockwise direction of rotation, and therefore wherein the free end 15a of the cam 12a acts by pushing on the pusher 16a and causes the upwards shifting movement of the second pusher 16a, which therefore actuates the decompression valve of the second coupler 20a.

Each of the upwards and, respectively, downwards movements of the lever 10 results, therefore, in the simultaneous rotation of both cams 12a and 12b.

However, the device according to the embodiment of the present invention described herein with reference to the Figures allows the individual actuation of the single valves and, consequently, the connection of one coupler at a time.

The operator may act on the actuation lever 10 by pushing it downwards to decompress a line and connect a coupler, or, even afterwards, by pulling it upwards to decompress the other line and connect the other coupler.

Figure 4A:
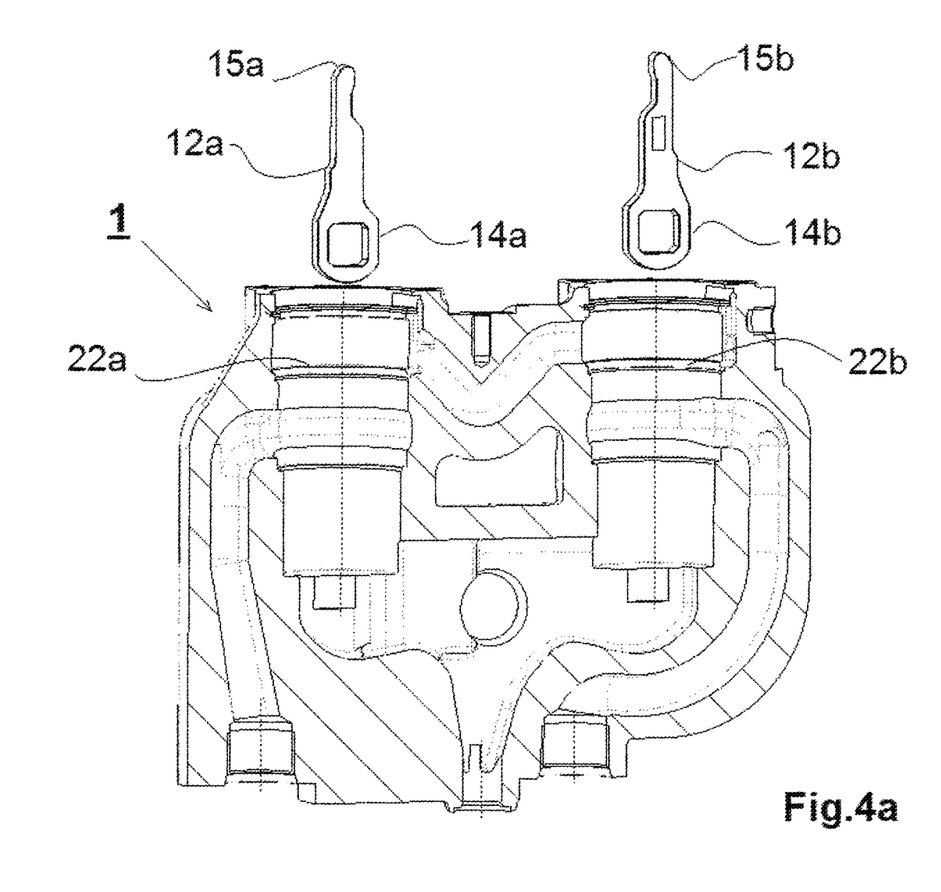
Figure 4B:
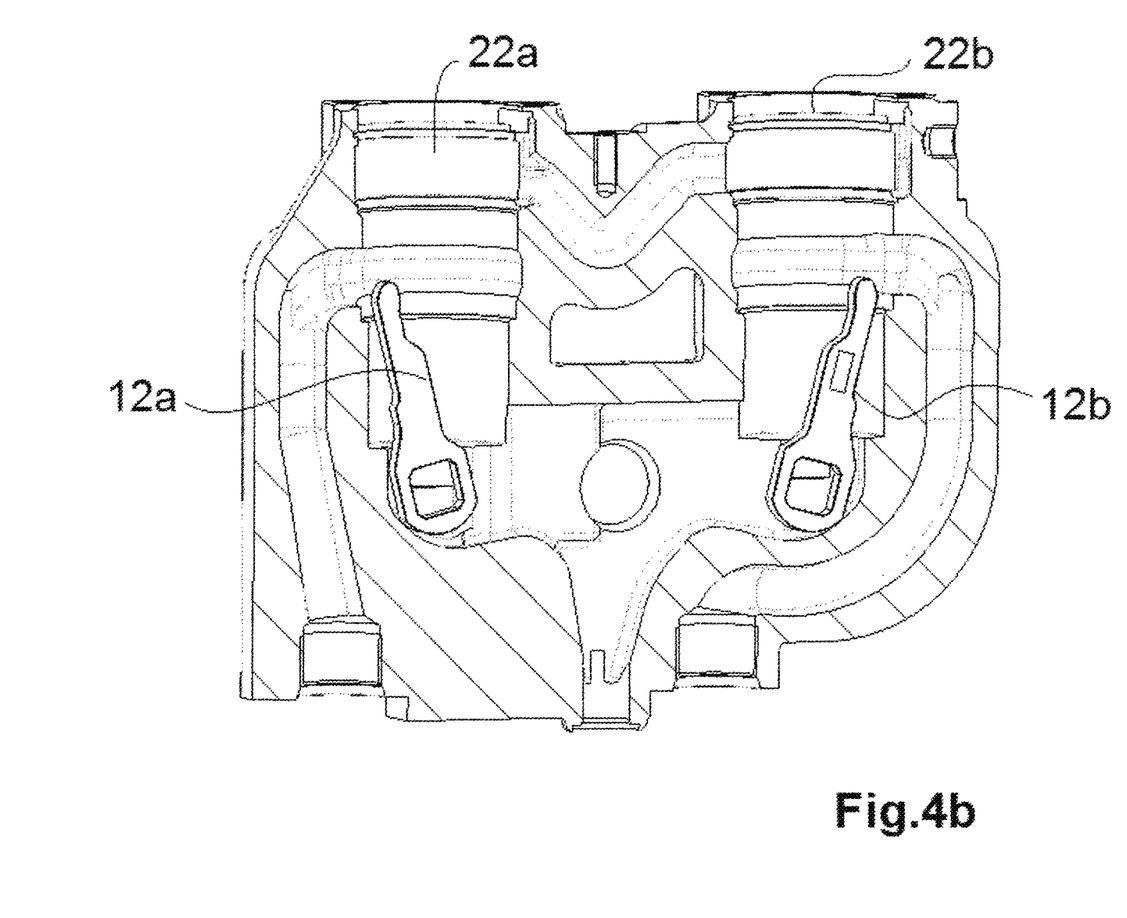
Figure 4C:
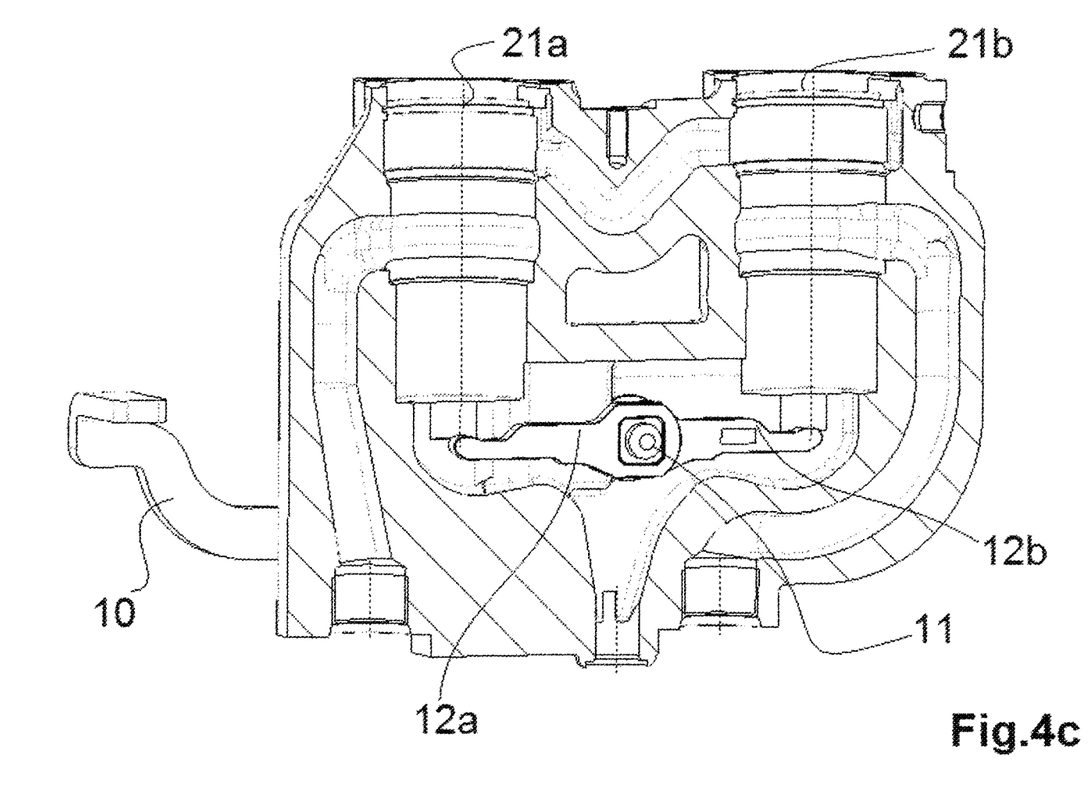

With particular reference to Figures from 4a to 4c, the modes for assembling the cams 12a, 12b inside the device, in particular of the main housing body 30, will now be described.

By virtue of the splitting of the cams 12a, 12b forming part of the actuation means of the decompression valves of the couplers, each of said first cam 12a and second cam 12b may be assembled by means of the insertion inside the containment block 30 through the seat 22a and 22b, respectively, intended to house the couplers 20a and 20b, respectively.

Therefore, before the couplers 20a and 20b are inserted into the seats thereof inside the containment body 30, the cams are inserted through said seats, as shown in FIG. 4a. In particular, the cams are dropped by gravity inside the seats 22a, 22b of the couplers, making sure they are inserted with the central portion 14a, 14b downwards, until reaching the internal surface of the chamber 50, as shown in FIG. 4b.

Thereafter, the operator performing the assembly, manually or possibly by means of simple tools, leads the cams 12a and 12b so as to position them as shown in FIG. 4c, i.e. with the engagement portion 14b of the cam 12b superimposed on the engagement portion 14a of the cam 12a along a direction substantially parallel to the longitudinal extension direction of the pin or shaft 11 once assembled, and, in particular, with the engagement seats superimposed and aligned so as to be engaged by the square section engagement seat of the pin 11. It should be noted that to ensure the correct positioning of the cams 12a and 12b inside the housing body 30, as shown in the Figures, the chamber 50 is suitably shaped so as to ensure that the final positioning of the cams 12a, 12b inside the chamber 50 is the correct one.

Figure 4D:
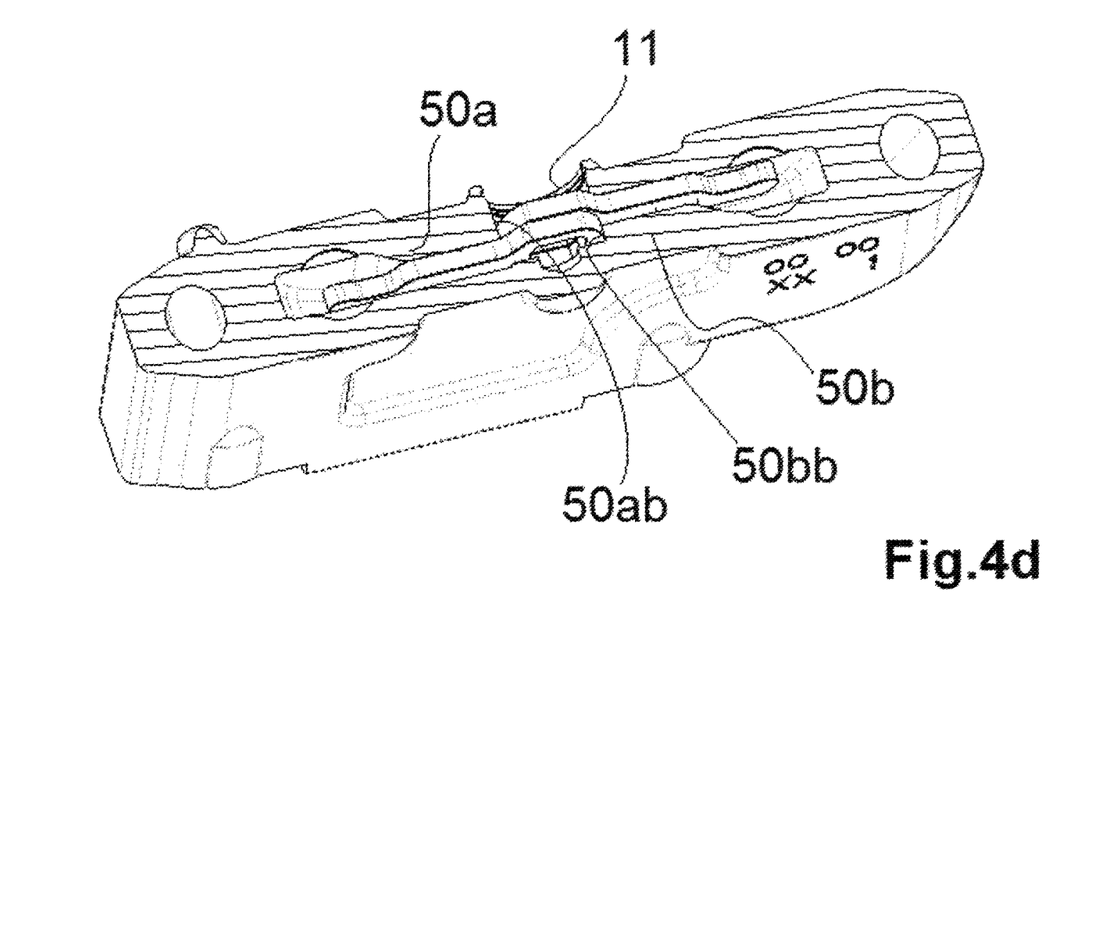
FIG. 4d shows a partial section view with a horizontal transverse plane of the multi-coupler connector device with lever actuation according to an embodiment of the present invention.

In particular, it is noted how the cross section of said chamber 50 according to a substantially horizontal plane (FIG. 4d) has a shaping adapted to lead the cams 12a, 12b in the final position thereof. In particular, considering the views from 4a to 4c as front perspective views, the cam 12a is positioned in front with respect to the cam 12b. Considering this orientation system, in the sectional view of FIG. 4d it can be noticed how the rear wall of the chamber 50 has a tapering 50a narrowing the chamber 50 towards the front area of the body or block 30 (and, therefore, of the device), while the front wall of the chamber 50 has a tapering narrowing the chamber 50 towards the rear area of the body or block 30, so that the descent of the cams 12a and 12b along the seats 22a and 22b, respectively, until each adopting the horizontal position of the FIGS. 4c and 4d, results in the adoption by the cams 12a and 12b of the only mutual arrangement possible, i.e., that in which the central portion 14a of the first cam 12a is superimposed on the end 14b of the second cam 12b. Finally, it should be noted that each of the taperings 50a and 50b define an abutment or end-of-stroke surface 5ab and 50bb, respectively, which define the end-of-stroke position of the cam 12b and the cam 12a, respectively, during the descent thereof into the chamber 50, in accordance with the modes described above.

It has thus been shown, by means of the above detailed description of the embodiments of the connector device according to the present invention shown in the drawings, that the present invention allows to achieve the preset objects and, therefore to overcome or at least minimize the drawbacks observed in the devices of the background art.

In particular, the connector device according to the present invention, while allowing the actuation of a single coupler at a time with a simple and reliable mechanism, allows for assembly modes as simple and reliable, and, above all, avoids the need to set up an assembly window for the assembly of the cams, with obvious benefits both in terms of low assembly and production costs, and in terms of improved reliability, since the leakages which, conversely, occur in the devices of the background art at the assembly window itself are avoided.

The connector device according to the present invention is subject to those modifications which, based on the detailed description of the embodiments shown in the accompanying drawings, will be apparent and obvious to those skilled in the art.

For example, with reference to the shape of the engagement portion of the pin 11, shapes with sections different from a square one (with or without rounded corners) may be preferred, for example, triangular, pentagonal, hexagonal sections, and so on.

In the same way, depending on the requirements and/or circumstances, both the number of couplers housed in the main body, as well as the type of couplers, male or female, may vary.

Finally, depending on the requirements and/or circumstances, the direction of rotation, clockwise or counterclockwise, of the pin 11, and therefore of the cams, generated by the upwards or downwards movement, respectively, of the lever 10, may be varied.

The scope of the present invention is therefore defined by the appended claims, which form an integral part of the text.

The invention claimed is:

1. A connector device of the multi-coupler type comprising at least one pair of couplers inserted into a housing body and equipped with a lever actuated mechanism comprising an actuation lever maneuverable by the user for the relief of the residual pressure inside the couplers and the connection thereof to corresponding couplers, wherein said lever actuated mechanism further comprises a pair of cams, said cams being movable simultaneously and in a counterposed manner by said actuation lever;
   wherein said actuation lever is mechanically connected to a central pin so that the movement of said actuation lever sets in rotation said central pin on which said cams are rigidly engaged; and
   said actuation lever is shiftable between a rest position and a first position and between said rest position and a second position, wherein the shift of said lever from said rest position to said first position results in the rotation of said central pin and said two cams in a first direction of rotation, and wherein the shift of said lever from said rest position to said second position results in the rotation of said pin and said cams in a second direction of rotation opposite to said first direction of rotation.

2. The connector device according to claim 1, wherein the rotation of said cams in said first direction of rotation results M the actuation of a first coupler by one of said cams, and in that the rotation of said cams in said second direction of rotation results in the actuation of the second coupler of said at least two couplers by the second of said two cams.

3. The connector device according to claim 2, wherein, the actuation of said first coupler involves the actuation of a pressure relief valve on the corresponding coupler and in that the actuation of said second coupler involves the actuation of a pressure relief valve on the corresponding coupler.

4. The connector device according to claim 3, wherein each of said cams comprises a central body from which a rod-ike portion ending with a free end extends.

5. The connector device according to the preceding claim 4, wherein each of said central bodies comprises a seat for receiving the pin set in rotation by said actuation lever.

6. The connector device according to the preceding claim 5, wherein said pin comprises an engagement pardon on which corresponding seats, respectively obtained in said central bodies, are engaged for shape and size.

7. The connector device according to claim 6, wherein said housing body is a single body without front access compartments.

* * * * *